(12) United States Patent
Yeh et al.

(10) Patent No.: US 7,937,598 B2
(45) Date of Patent: May 3, 2011

(54) METHOD FOR OPERATING TV TUNER CARD

(75) Inventors: Chien-Ming Yeh, Chung Ho (TW);
Chien-Chung Chiang, Chung Ho (TW);
Neng-Chia Lee, Chung Ho (TW)

(73) Assignee: Avermedia Technologies, Inc., Chung Ho, Taipei Hsien (TW)

( * ) Notice: Subject to any disclaimer, the term of this patent is extended or adjusted under 35 U.S.C. 154(b) by 736 days.

(21) Appl. No.: 12/038,173

(22) Filed: Feb. 27, 2008

(65) Prior Publication Data

US 2009/0180036 A1 Jul. 16, 2009

(30) Foreign Application Priority Data

Jan. 10, 2008 (TW) .............................. 97101045 A

(51) Int. Cl.
*G06F 13/10* (2006.01)
*G06F 1/26* (2006.01)
*G06F 1/32* (2006.01)
(52) U.S. Cl. ............ 713/300; 713/1; 348/731; 348/734; 348/E5.097
(58) Field of Classification Search .................. 713/1, 2, 713/300, 310, 320–324, 330, 340; 348/731, 348/734, E5.097
See application file for complete search history.

(56) References Cited

U.S. PATENT DOCUMENTS

| 6,898,763 | B2 * | 5/2005 | Hagiwara et al. | 715/716 |
| 2002/0083349 | A1 | 6/2002 | Khatri et al. | |
| 2005/0154930 | A1 * | 7/2005 | Morrow | 713/300 |
| 2007/0172060 | A1 * | 7/2007 | Takezaki | 380/239 |
| 2007/0234084 | A1 * | 10/2007 | Furuta | 713/300 |
| 2009/0100280 | A1 * | 4/2009 | Lindsay | 713/321 |

FOREIGN PATENT DOCUMENTS

| CN | 2681483 | 2/2005 |
| WO | WO 2007/063450 | 6/2007 |

OTHER PUBLICATIONS

Kwa, S. et al., "PCI Express Architecture Power Management;" Intel Research and Development; 2002.
Wikipedia; "PCI Express;" http://en.wikipedia.org/w/index.php?title=PCI_Express&oldid=18...; Sep. 7, 2009.
ASUSTeK Computer Inc. Manual; "TV Tuner Product: My Cinema Series;", 2007.
English language translation of abstract of CN 2681483 (published Feb. 23, 2005).

* cited by examiner

*Primary Examiner* — Thomas Lee
*Assistant Examiner* — Fahmida Rahman
(74) *Attorney, Agent, or Firm* — Thomas, Kayden, Horstemeyer & Risley, LLP

(57) ABSTRACT

A TV tuner card operation method is described. A TV tuner module is provided to a computer, wherein the TV tuner module is electrically connected to the computer via a PCI-E interface. A remote controller is used to turn on an operation system of the computer via a wake pin of the PCI-E interface. The remote controller is used to operate all functions of the TV tuner module to display TV programs on a screen of the computer. When the PCI-E interface is adapted to a PCI-E card, the wake pin is B11 of the PCI-E card. When the PCI-E interface is adapted to a Mini card, the wake pin is Pin 1 of the Mini card. When the PCI-E interface is adapted to a PCI Express Card, the wake pin is Pin 11 of the PCI Express Card.

16 Claims, 3 Drawing Sheets

METHOD FOR OPERATING TV TUNER CARD

RELATED APPLICATIONS

This application claims priority to Taiwan Application Serial Number 97101045, filed Jan. 10, 2008, which is herein incorporated by reference.

BACKGROUND

1. Field of Invention

The present invention relates to an audio/video operation method. More particularly, the present invention relates to a TV tuner card operation method.

2. Description of Related Art

Most TV tuner cards for installing into a computer are able to receive and process TV signals, broadcast signals or other audio/video signals in order to output those media signals by the computer. Most TV tuner cards have a remote control functionality, which is only operable when the computer operation system has been started. That is, the remote control functionality is inoperable when the computer operation system has not been started. For those TV watchers, it is somewhat inconvenient to use a computer to display TV programs.

SUMMARY

It is therefore an objective of the present invention to provide a TV tuner card operation method.

In accordance with the foregoing and other objectives of the present invention, a TV tuner card operation method includes the following steps. A TV tuner module is provided to a computer, wherein the TV tuner module is electrically connected to the computer via a PCI-E interface. A remote controller is used to turn on an operation system of the computer via a wake pin of the PCI-E interface. The remote controller is used to operate all functions of the TV tuner module to display TV programs on a screen of the computer. When the PCI-E interface is adapted to a PCI-E card, the wake pin is B11 of the PCI-E card. When the PCI-E interface is adapted to a Mini card, the wake pin is Pin 1 of the Mini card. When the PCI-E interface is adapted to a PCI Express Card, the wake pin is Pin 11 of the PCI Express Card.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
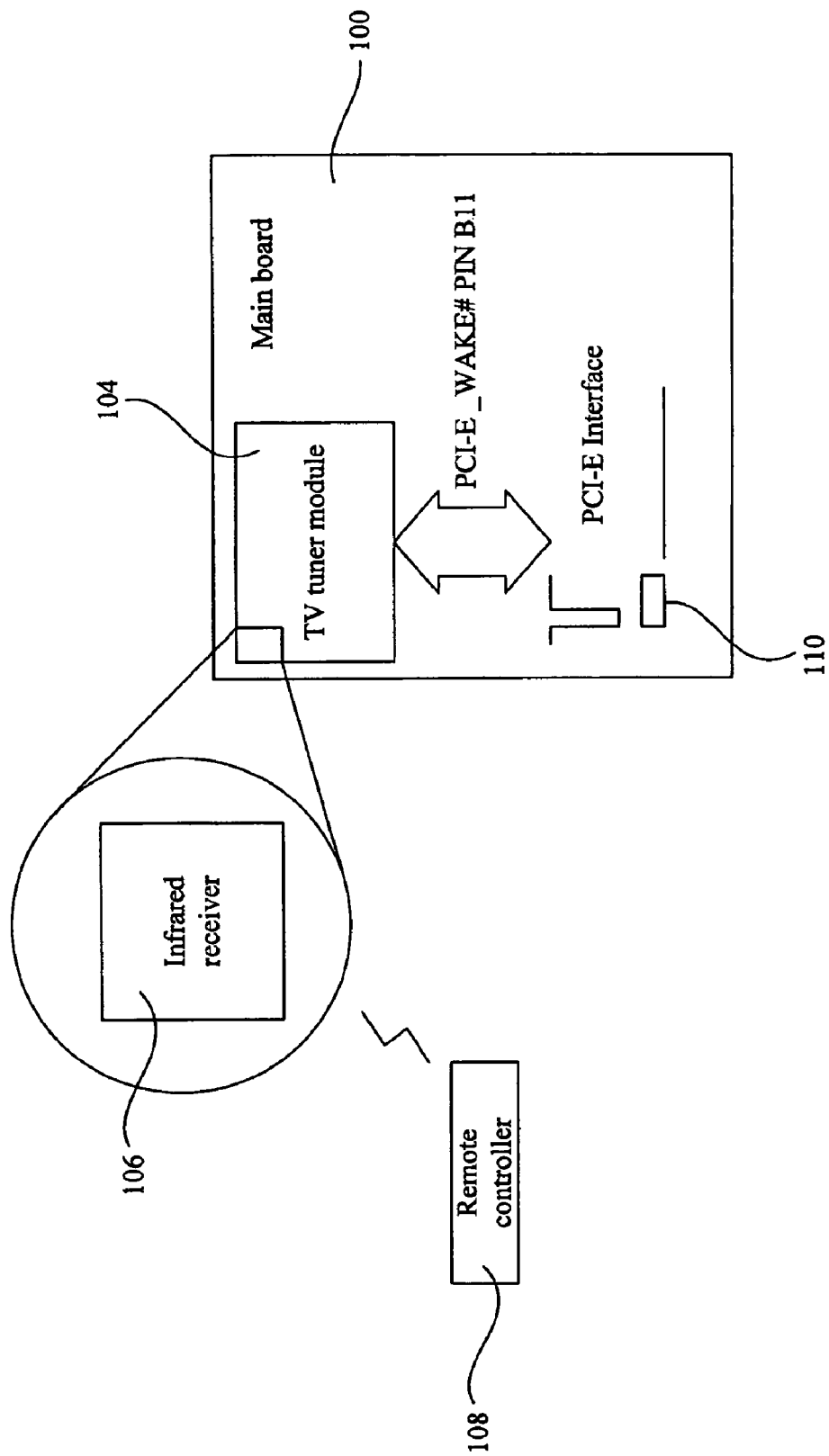
FIG. 1 illustrates how a TV tuner card operates according to one preferred embodiment of this invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 illustrates how a TV tuner card operates according to one preferred embodiment of this invention. When a TV tuner card 104 (also referred as a TV tuner module 104) is installed into a PCI-E (Peripheral Component Interconnect Express) interface 110 of a computer's main board 100, the following method is provided to operate the TV tuner card 104. The TV tuner module 104 has an infrared receiver 106 to receive control signals from a remote controller 108. The PCI-E interface 110 is not only used to control TV program displaying on the computer's screen, but also its wake pin used to turn on or turn off the computer.

Generally speaking, the PCI-E interface includes three types. The first type is adapted to a PCI-E Card and most frequently used in a desktop computer. The second type is adapted to a Mini Card and most frequently used in a notebook computer. The third type is adapted to a PCI Express Card and detachably connected with a notebook computer. When the PCI-E interface 110 is adapted to a PCI-E Card, wake pin B11 of the PCI-E Card is used to turn on or turn off a computer in present invention. When the PCI-E interface 110 is adapted to a Mini Card, wake pin 1 of the Mini Card is used to turn on or turn off a computer in present invention. When the PCI-E interface 110 is adapted to a PCI Express Card, wake pin 11 of the PCI Express Card is used to turn on or turn off a computer in present invention.

Figure 2:
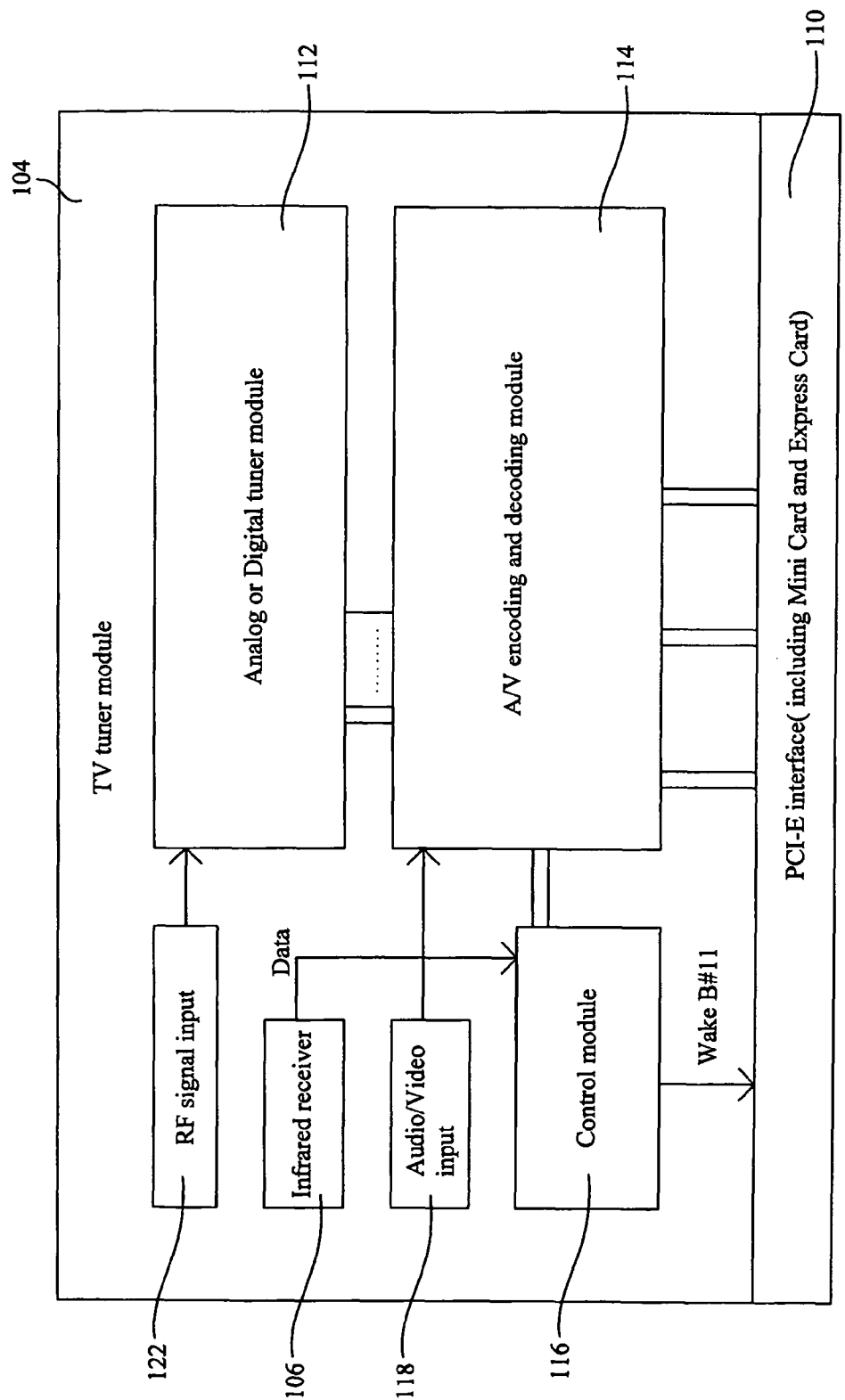
FIG. 2 illustrates a block diagram of a TV tuner card according to one preferred embodiment of this invention.

FIG. 2 illustrates a block diagram of a TV tuner card according to one preferred embodiment of this invention. The TV tuner module 104 includes an analog or digital tuner module 112 to receive a RF signal input 122 (TV program signals). The RF signal input 122 is transformed by the analog or digital tuner module 112 and an A/V (Audio/Video) encoding and decoding module 114 as a media signal which a computer could process and display. The A/V encoding and decoding module 114 also receive other signal input 118 (non-TV program signals). The A/V encoding and decoding module 114 is electrically connected to the PCI-E interface 110. The PCI-E interface 110 can be adapted to PCI-Ex1, PCI-Ex4, PCI-Ex8 or PCI-Ex16, also adapted to Mini Card or PCI Express Card. The TV tuner module 104 includes a control module 116, which is not only electrically connected to the A/V encoding and decoding module 114, but also electrically connected to wake pin B11 of the PCI-E interface 110. In this embodiment, the PCI-E interface 110 is adapted to a PCI-E Card, wake pin B11 of the PCI-E Card is used to turn on or turn off a computer. In a second embodiment, the PCI-E interface is adapted to a Mini Card, wake pin 1 of the Mini Card is used to turn on or turn off a computer (not illustrated in drawings). In a third embodiment, the PCI-E interface is adapted to a PCI Express Card, wake pin 11 of the PCI Express Card is used to turn on or turn off a computer (not illustrated in drawings). When the infrared receiver 106 receives control signals of turning on or turning off the computer, the control module 116 would direct the computer to turn on or turn off via wake pin B11 of the PCI-E interface 110 (or Pin 1 of Mini Card, or Pin 11 of PCI Express Card).

Before using the TV tuner module 104 to direct the computer to turn on or turn off via the PCI-E interface, "Power On By PCI" option of "POWER Item" in the computer's BIOS (Basic Input Output System) is switched to "Enabled". TV tuner card supplier can define its function key (such as "power" key) on the remote controller 108 to turn on or turn off a computer. The remote controller 108 can be used to turn a computer off to S3, S4 or S5 status. (S3: all computer components are powered off except main memory; S4: all content of main memory is saved to non-volatile memory and all computer components are powered off; S5: all computer components are powered off). In addition, the TV tuner module 104 (particularly the infrared receiver 106) should be constantly supplied with power, the infrared receiver 106 could receive control signals from the remote controller 108 at any time.

Figure 3:
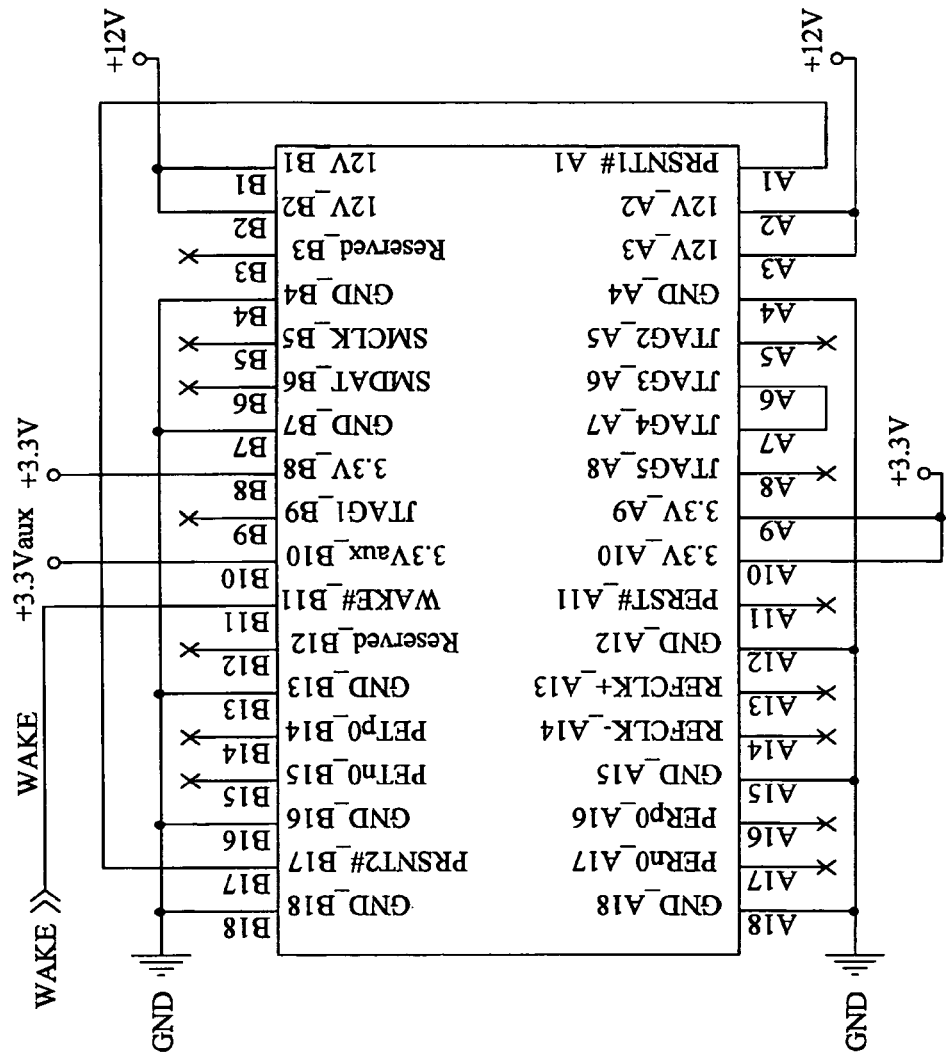
FIG. 3 illustrates a pin diagram of a PCI-E interface according to one preferred embodiment of this invention.

FIG. 3 illustrates a pin diagram of a PCI-E interface according to one preferred embodiment of this invention. This diagram illustrates pin definitions of the PCE-E interface, wherein wake #B11 (or Pin 1 of Mini Card, or Pin 11 of PCI Express Card) is used to turn on or turn off a computer in present invention. Those skilled in the art may use this diagram to achieve the TV tuner card operation method presented in present invention.

According to embodiments discussed above, the TV tuner card operation method of present invention uses remote control to operate the TV tuner card and turn on/off the computer such that TV watchers could merely use a remote controller to direct a computer to display TV programs without turning on the computer first. Moreover, the remote controller can be further defined to turn the computer off to S3, S4 or S5 status.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A TV tuner card operation method, comprising:
providing a TV tuner module to a computer, wherein the TV tuner module is electrically connected to the computer via a PCI-E interface;
using a remote controller to turn on or turn off an operation system of the computer via a wake pin of the PCI-E interface;
using the remote controller to operate all functions of the TV tuner module to display TV programs on a screen of the computer,
wherein when the PCI-E interface is adapted to a PCI-E card, the wake pin is B11 of the PCI-E card, when the PCI-E interface is adapted to a Mini card, the wake pin is Pin 1 of the Mini card, when the PCI-E interface is adapted to a PCI Express Card, the wake pin is Pin 11 of the PCI Express Card.

2. The TV tuner card operation method of claim 1, wherein the PCI-E interface comprises PCI-Ex1, PCI-Ex4, PCI-Ex8 or PCI-Ex16 type.

3. The TV tuner card operation method of claim 1, further comprising a step of turning the computer off to a S3, S4 or S5 status, wherein the S3 status is "all computer components are powered off except main memory", the S4 status is "all content of main memory is saved to non-volatile memory and all computer components are powered off", and the S5 status is "all computer components are powered off".

4. The TV tuner card operation method of claim 1, wherein the TV tuner module comprises an infrared receiver to receive signals from the remote controller.

5. The TV tuner card operation method of claim 4, wherein the TV tuner module comprises a control module, which receive signals from the infrared receiver and is electrically connected to the wake pin of the PCI-E interface.

6. The TV tuner card operation method of claim 1, further comprising a step of constantly supplying power to the TV tuner module.

7. The TV tuner card operation method of claim 1, wherein the TV tuner module comprises an analog or digital tuner module to receive TV program signals.

8. The TV tuner card operation method of claim 1, wherein the TV tuner module comprises an A/V encoding and decoding module, which receive non-TV program signals and is electrically connected to the PCI-E interface.

9. A TV tuner card operation method, comprising:
switching "Power On By PCI" option of "POWER Item" in the computer's BIOS to "Enabled";
providing a TV tuner module to a computer, wherein the TV tuner module is electrically connected to the computer via a PCI-E interface;
using a remote controller to turn on or turn off an operation system of the computer via a wake pin of the PCI-E interface;
using the remote controller to operate all functions of the TV tuner module to display TV programs on a screen of the computer,
wherein when the PCI-E interface is adapted to a PCI-E card, the wake pin is B11 of the PCI-E card, when the PCI-E interface is adapted to a Mini card, the wake pin is Pin 1 of the Mini card, when the PCI-E interface is adapted to a PCI Express Card, the wake pin is Pin 11 of the PCI Express Card.

10. The TV tuner card operation method of claim 9, wherein the PCI-E interface comprises PCI-Ex1, PCI-Ex4, PCI-Ex8 or PCI-Ex16 type.

11. The TV tuner card operation method of claim 9, further comprising a step of turning the computer off to a S3, S4 or S5 status, wherein the S3 status is "all computer components are powered off except a main memory", the S4 status is "all content of main memory is saved to non-volatile memory and all computer components are powered off", and the S5 status is "all computer components are powered off".

12. The TV tuner card operation method of claim 9, wherein the TV tuner module comprises an infrared receiver to receive signals from the remote controller.

13. The TV tuner card operation method of claim 12, wherein the TV tuner module comprises a control module, which receive signals from the infrared receiver and is electrically connected to the wake pin of the PCI-E interface.

14. The TV tuner card operation method of claim 9, further comprising a step of constantly supplying power to the TV tuner module.

15. The TV tuner card operation method of claim 9, wherein the TV tuner module comprises an analog or digital tuner module to receive TV program signals.

16. The TV tuner card operation method of claim 9, wherein the TV tuner module comprises an A/V encoding and decoding module, which receive non-TV program signals and is electrically connected to the PCI-E interface.

* * * * *